United States Patent [19]

Takamatsu et al.

[11] Patent Number: 5,317,152
[45] Date of Patent: May 31, 1994

[54] CANTILEVER TYPE PROBE, AND SCANNING TUNNEL MICROSCOPE AND INFORMATION PROCESSING APPARATUS EMPLOYING THE SAME

[75] Inventors: Osamu Takamatsu, Atsugi; Yutaka Hirai, Tokyo; Masaru Nakayama, Atsugi; Takayuki Yagi, Machida; Yuji Kasanuki, Isehara; Yasuhiro Shimada, Atsugi, all of Japan

[73] Assignee: Canon Kabushiki Kaisha, Tokyo, Japan

[21] Appl. No.: 871,727

[22] Filed: Apr. 21, 1992

[30] Foreign Application Priority Data

Apr. 22, 1991 [JP] Japan .................. 3-116544

[51] Int. Cl.⁵ .............. H01J 37/26; H01L 41/22
[52] U.S. Cl. .................. 250/306; 369/126
[58] Field of Search ............. 250/306, 307, 310; 369/126, 101; 346/158; 29/25.35

[56] References Cited

U.S. PATENT DOCUMENTS

| | | | |
|---|---|---|---|
| 4,894,538 | 1/1990 | Iwatsuki et al. | 250/306 |
| 4,912,822 | 4/1990 | Zdeblick et al. | 250/306 |
| 4,998,016 | 3/1991 | Nose et al. | 250/306 |

FOREIGN PATENT DOCUMENTS

| | | |
|---|---|---|
| 88161552 | 7/1988 | Japan . |
| 88161553 | 7/1988 | Japan . |

OTHER PUBLICATIONS

"Microfabrication of integrated scanning tunneling microscope" by Thomas R. Albrecht et al.: Journal of Vacuum Science & Technology, Second. Series vol. 8, No. 1; Jan./Feb. 1990; pp. 317-318.

Primary Examiner—Jack I. Berman
Assistant Examiner—James Beyer
Attorney, Agent, or Firm—Fitzpatrick, Cella, Harper & Scinto

[57] ABSTRACT

A cantilever type probe comprises a cantilever-shaped displacement element and a tip which displacement element has a first electrode layer, a first piezoelectric material film and a second piezoelectric material film which films are laminated on opposite sides of the first electrode layer, and a second electrode layer and a third electrode layer which layer are laminated on outer surfaces of the piezoelectric material films, and which tip is connected with a leader electrode located at a free end of the surface of the displacement element; wherein in the width direction of the cantilever both ends of the first electrode layer protrude outward more than each end of the second and third electrode layers. A scanning tunneling microscope comprises the cantilever type probe, a driving means for displacing the probe, a stage for specimen so as to approach and locate the specimen to the tip, and a potential applying means for applying a bias voltage between the tip and the specimen. An information processing apparatus further comprises a second potential applying means for applying a pulse and bias voltage between the tip and the recording medium; wherein an information is written on the recording medium and an information in the recording medium is read out by electric current flowing between the tip and the recording medium.

11 Claims, 3 Drawing Sheets

CANTILEVER TYPE PROBE, AND SCANNING TUNNEL MICROSCOPE AND INFORMATION PROCESSING APPARATUS EMPLOYING THE SAME

BACKGROUND OF THE INVENTION

1. Field of the Invention

The present invention relates to a cantilever type probe for a scanning tunnel microscope (hereinafter referred to as "STM"), and a scanning tunnel microscope provided with the probe.

The present invention further relates to an information-processing apparatus which records, reproduces and erases information by an STM technique employing the above cantilever type probe.

2. Related Background Art

In recent years, scanning tunnel microscopy has been developed which enables direct Observation of the electronic structure of atoms on a surface of a conductor (G. Binnig, et al.: Phys. Rev. Lett. 49, (1982) 57). With this technique, real spatial images of materials, whether single crystalline or amorphous, can be measured with extremely high resolution (nanometer or less). The STM utilizes a tunnel current which flows between a metallic tip and an electroconductive substance when a voltage is applied between the probe and the substance which are brought as close as about 1 nm. This tunnel current is highly sensitive to the change of distance between the two, and varies exponentially. Accordingly, real spatial surface structure can be observed with a resolution of atomic order by scanning the surface with the probe while keeping the tunnel current constant. The analysis by use of the STM is limited to electroconductive materials. However, the STM is coming into use for structure analysis of a thin insulation film formed thin on a surface of an electroconducitve materials. Such an apparatus and method are advantageous in that the observation can be conducted with low electric power without impairing the medium since the apparatus and the method utilize detection of extremely weak current. Furthermore, the apparatus can be operated in the atmosphere, and are promising for a variety of application fields.

In particular, the technique is becoming practical for high density recording-reproducing, as disclosed in Japanese Patent Application Laid-Open Nos. 63-161552, 63-161553, etc. This method employs a probe electrode similar to that of STM, and conducts recording by varying the voltage between a probe and a recording medium, the recording medium being a material exhibiting memorizable switching characteristics in its voltage-current characteristics, e.g., thin films of chalcogens and $\pi$-electron type organic compounds. In this method, the reproduction is conducted by utilizing the difference of the tunnel resistance between recorded areas and non-recorded areas. In such a recording system, a recording medium that changes its surface shape with the voltage applied to the tip may be used.

In the operation of the STM or the recording and reproducing by application of the STM, it is important to control the distance between the specimen and the sample or the recording medium in the order of angstroms, and to control the two-dimensional scanning with an accuracy of several ten angstroms in recording and reproducing the two-dimensionally arranged information. Furthermore, simultaneous driving of a plurality of probes (namely, multiplication of the probe) is proposed to improve the functionality, particularly, to speed-up the recording-reproduction system. With the multiple probes, the relative position of the probe and the medium has to be three-dimensionally controlled with the accuracy mentioned above within the area where the multiple probes are used.

Heretofore, the control of the probe has been conducted by using a lamination type piezoelectric element or a cylindrical piezoelectric element attached at the probe side or the medium side. Such elements, which are capable of larger displacement, are not suitable for integration, and are disadvantageous in use for the multiprobe type recording-reproducing apparatus. The tip module may be fitted onto a cantilever of several hundred $\mu$m long, and the cantilever may be driven by a piezoelectric element to avoid this disadvantage.

In a known method, a cantilever having a multilayer structure constituted of a thin piezoelectric film, a metallic film, and so forth is prepared by utilizing a technique of forming a fine structure on a substrate in a semiconductor production process (T. R. Albrecht, et al.: "Microfabrication of Integrated Scanning Tunneling microscope", Proceedings Fourth International Conference on Scanning Tunneling Microscopy/Spectroscopy, 1990).

Figure 3:
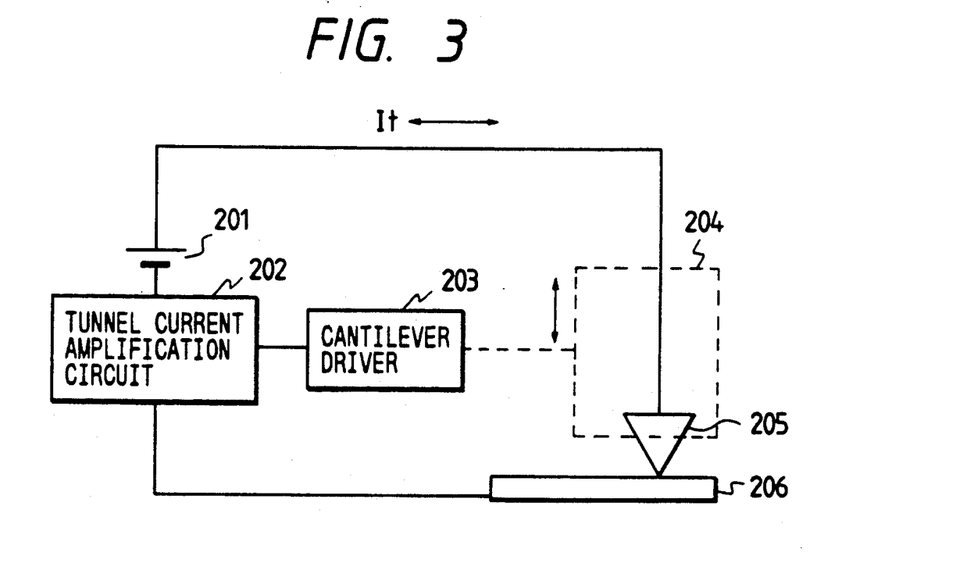
FIG. 3 is a block diagram of an STM apparatus of the present invention.
Figure 4:
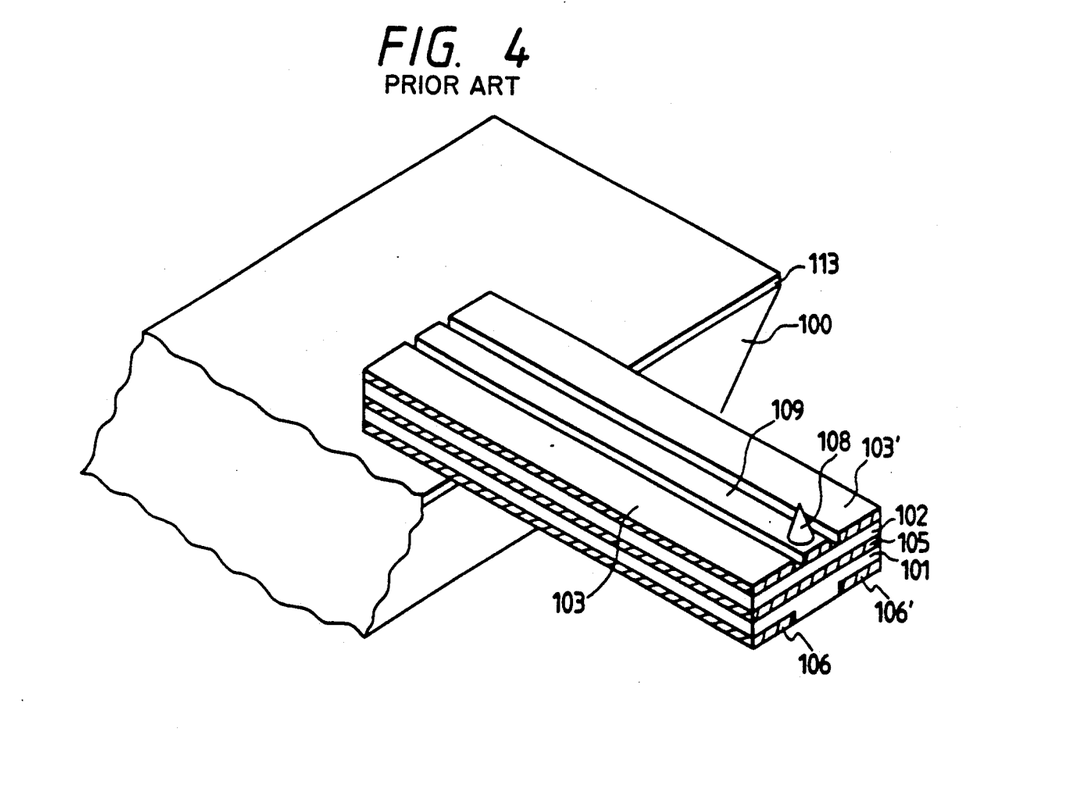
FIG. 4 is a perspective view of a conventional cantilever type probe.

FIG. 4 is a perspective view of a conventional cantilever type probe. The probe includes piezoelectric thin films 101, 102; piezoelectric film-driving electrodes 103, 103', 105, 106, 106': a tip 108; a probe leader electrode 109; a silicon substrate 100; and a thin $Si_3N_4$ film 113. FIG. 3 is a block diagram of an STM apparatus employing the cantilever type probe. The STM of the block diagram includes a bias applying power source 201, a tunnel current amplification circuit 202, a cantilever driver 203, a cantilever 204, a probe 205, and a test specimen 206. The tunnel current $I_t$ flowing between the probe 205 and the specimen 206 is detected, and the cantilever is driven by application of feedback so as to keep $I_t$ constant, whereby the gap between the probe 205 and the specimen 206 is kept constant.

Figure 5:
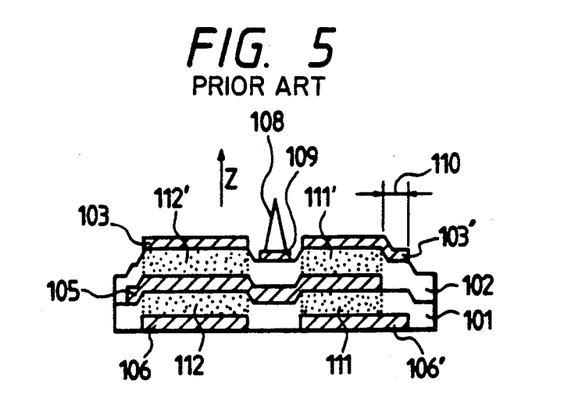
FIG. 5 a cross-sectional view of a conventional cantilever type probe in which the electrodes deviate positionally.

In conventional cantilever type probes piezoelectric film-driving electrodes including an upper electrode, a lower electrode, and an intermediate electrode formed of the same width. Consequently, positional deviation 110 of the driving electrodes, as shown in FIG. 5, in forming the pattern of the electrodes is caused by an aligning error, which disadvantageously leads to a change of the effective electrode areas. This positional deviation arises in a mask alignment in photolithography process, and is usually within $\pm 3$ $\mu$m depending on the mask aligner employed. This positional deviation makes the area between the counter electrodes in the displacement regions 111, 111' smaller than that in the displacement regions 112, 112', which reduces the displacement, and disadvantageously result in twisting of the cantilever. Therefore, when this cantilever is used in STM operation or STM recording-reproducing apparatus, the moving direction of the cantilever is changed to cause positional deviation relative to the coordinate of access, making the stable operation thereof difficult. When the twisting is larger, the end portion of the cantilever may be brought into contact with the specimen rather than the probe, which may damage the specimen or the recording medium.

SUMMARY OF THE INVENTION

The present invention intends to avoid the above described disadvantages of conventional cantilever type probes, and to provide a scanning tunnel microscope, an information processing apparatus, and a cantilever type probe employed therefor which are reliable and stable and in which the influence of the positional deviation of piezoelectric film driving electrode is reduced and thereby the twisting of the cantilever in operation is decreased.

In the cantilever type probe of bimorph construction of the present invention, an intermediate driving electrode is made wider than the upper and lower driving electrodes so that the intermediate electrode stretches outward at both sides in the width direction, and the areas of the displacement region of the piezoelectric bodies are not decreased even if the patterns of the driving electrodes are formed with positional deviation.

According to a first aspect of the present invention, there is provided a cantilever type probe including a cantilever-shaped displacement element and a tip. The displacement element has a first electrode layer, a first piezoelectric material film and a second piezoelectric material film which films are laminated on respective sides of the first electrode layer, and a second electrode layer and a third electrode layer which layers are laminated on respective surfaces of the piezoelectric material films. The tip is connected with a leader electrode located at a free end of the surface of the displacement element. The width direction of both cantilever ends of the first electrode layer protrude outward more than each end of the second and third electrode layers. Preferably a width of the first electrode layer is larger than that of each of the second electrode layer and third electrode layer in the width direction of the displacement element. Preferably a difference in the width in the width direction of the displacement element between the first electrode layer and either the second electrode layer or the third electrode layer is not less than twice the maximum positional deviation in electrode alignment. Preferably both of the second and third electrode layers are separated in the width direction of the displacement element. Preferably a driving electric source for displacing the displacement element by a converse piezoelectric effect is connected with the first, second and third electrode layers. Preferably a virtual area of the first electrode layer is larger than those of the second and third electrode layers, respectively. Preferably the first, second and third electrode layers are placed in parallel with each other.

According to a second aspect of the present invention, there is provided a scanning tunneling microscope including a cantilever type probe according to the first aspect of the present invention, a driving means for displacing the probe, a stage for specimen so as to approach and locate the specimen close to the tip, and a potential applying means for applying a bias voltage between the tip and the specimen.

According to a third aspect of the present invention, there is provided an information processing apparatus, including a cantilever type probe according to the first aspect of the present invention, a driver for displacing the probe, a stage for a recording medium so as to approach and locate the recording medium close to the tip of the probe, and a potential applying means for applying a pulse voltage between the tip and the recording medium; wherein information is written on the recording medium by electric current flowing between the tip and the recording medium.

According to a fourth aspect of the present invention, there is provided an information processing apparatus, including a cantilever type probe according to the first aspect of the present invention, a driving means for displacing the probe, a stage for a recording medium so as to approach and locate the recording medium close the tip, and a potential applying means for applying a bias voltage between the tip and the recording medium; wherein information in the recording medium is read out by electric current flowing between the tip and the recording medium.

According to a fifth aspect of the present invention, there is provided an information processing apparatus, including a cantilever type probe according to the first aspect of the present invention, a driver for displacing the probe, a stage for a recording medium so as to approach and locate the recording medium close to the tip of the probe, a first potential applying means for applying a pulse voltage between the tip and the recording medium, and a second potential applying means for applying a bias voltage between the tip end the recording medium; wherein information is written on the recording medium and information in the recording medium is read out by electric current flowing between the tip and the recording medium.

In the aforementioned information processing apparatuses, the recording medium exhibits preferably electric memory effect.

DESCRIPTION OF THE PREFERRED EMBODIMENT

The present invention is described below in detail by reference to the drawings.

Figure 1:
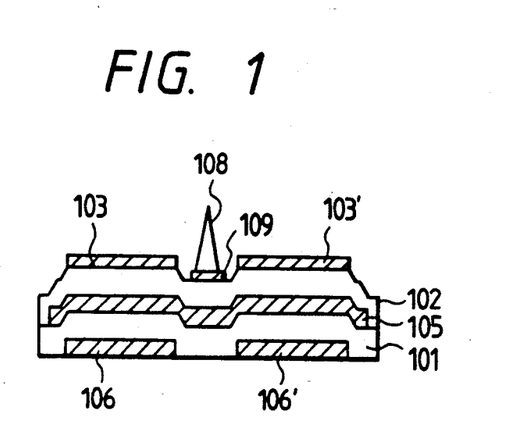
FIG. 1 is a cross-sectional view of a cantilever type probe of the present invention.

FIG. 1 is a cross-sectional view in a width direction of a cantilever type probe of the present invention. First, on the lower driving electrodes 106, 106', a first piezoelectric film 101 is formed. Then an intermediate driving electrode 105 is formed thereon by alignment with the lower driving electrodes 106, 106'. In order to cover the lower driving electrodes 106, 106' irrespective of positional deviation at the pattern formation. The width of the intermediate driving electrode 105 is preferably made larger than those of the lower driving electrodes 106, 106' by twice or more the maximum positional deviation caused by the maximum alignment error. For example, if the widths of the lower driving electrodes 106, 106' are respectively 50 $\mu$m, the gap between the electrodes is 30 $\mu$m, and the alignment accuracy is $\pm 2$ $\mu$m, then the maximum positional deviation is 2 $\mu$m for one side, and the intermediate electrode 105 is made larger by $2\times2$ $\mu$m, namely 4 $\mu$m or more, for the both sides to have a width of 134 $\mu$m or more. Herein the "width" of the electrode is the distance from one edge to the opposite edge. If the edge is tapered, the larger length of the upper or lower face of the electrode is taken as the electrode width. Subsequently, the second piezoelectric film 102 is formed on the intermediate driving electrode 105, and on the piezoelectric film 102, the upper driving electrodes 103, 103' and the probe leader electrode 109 are formed by alignment with the intermediate driving electrode 105. Even if positional deviation arises in this stage, the displacement region is not decreased since the intermediate driving electrode, a counter electrode, is made wider than the upper and lower driving electrodes by the extent of the alignment error or more. Thereafter, the tip is formed and the substrate under the cantilever is removed to complete a cantilever type probe.

The materials and the method of preparation of such driving electrodes and piezoelectric films are already known, the method including thin film forming techniques such as vacuum vapor evaporation, sputtering, and chemical vapor deposition employed generally in semiconductor industry, photolithography techniques, and etching techniques. The methods of preparation do not limit the present invention.

A recording medium suitably used for information recording in the present invention is constituted of a substrate (electrode substrate) and a recording layer formed thereon, and exhibits memory-switching phenomenon in current-voltage characteristics (electric memory effect).

The electric memory effect in the present invention means a phenomenon wherein the recording layer assumes two or more resistance states corresponding to applied voltage and the resistance state is arbitrarily changed by application of a voltage or a current exceeding a threshold value for changing the conductivity of the recording layer, while the state is kept unchanged under application of a voltage or a current not exceeding the threshold value.

The specific examples of the materials for the recording layer include the three groups of substances below.

(1) Amorphous semiconductors such as oxide glass, borate glass, and chalcogenide glass containing Se, Te, or As combined with an element of Group III, IV, V, or VI of the periodic table:

These are intrinsic semiconductors having an optical band gap Eg in the range of from 0.6 to 1.4 eV or an electric activation energy $\Delta E$ in the range of from about 0.7 to about 1.6 eV. The specific examples of the chalcogenide glass are As-Se-Te types, Ge-As-Se types, Si-Ge-As-Te types such as $Si_{16}Ge_{14}As_5Te_{65}$ (the subscript meaning the atomic percentages), Ge-Te-X types, and Si-Te-X type (X being a small amount of element of Group V or VI) such as $Ge_{15}Te_{81}Sb_2S_2$. Further, Ge-Sb-Se types of chalcogenide glass may be used.

An amorphous semiconductor layer formed by deposition of the above compound exhibits the electric memory effect by applying voltage in a direction perpendicular to the film through the probe electrode.

The deposition of such materials can be conducted satisfactorily by conventional thin film forming techniques. Suitable film forming methods include vacuum vapor deposition, cluster ion beam methods, and so forth. The electric memory effect of such materials is observed generally at the thickness of several $\mu m$ or less. Preferably, the thickness is 1 m or less, more preferably 500Å or less in view of uniformity and recording characteristics. Further, from the viewpoint of recording resolution of the recording medium, a thinner recording layer is desired. Therefore the film thickness is more preferably in the range of from 30 to 200Å.

(2) Organic semiconductor layers formed by depositing a salt of a metal having relatively low reduction potential such as copper and silver with an electron-accepting compound:

The electron acceptor includes tetracyanoquinodimethane (TCNQ), TCNQ derivatives, e.g; tetrafluorotetracyanoquinodimethane (TCNQF$_4$), tetracyanoethylene (TCNE), tetracyanonaphthoquinodimethane (TNAP), and the like:

Such organic semiconductor layer can be formed by vacuum vapor deposition of the above-mentioned electron-accepting compound on a copper or silver electrode.

The electric memory effect of such organic semiconductors are observed at the film thickness of several ten $\mu m$ or less. In view of the film-forming property and uniformity, the thickness is preferably 1 $\mu m$ or less, more preferably in the range of from 30 to 500Å.

(3) Recording media comprising a film of a substance composed of a molecule having both a group having $\pi$-electron levels and a group having only $\sigma$-electron levels:

The coloring matter having a $\pi$-electron system in the present invention preferably includes dyes having a porphyrin skeleton such as phthalocyanine, tetraphenylporphyrin: azulene type dyes having a squarilium group and croconic methine group as a bonding chain; cyanine type dyes in which two nitrogen-containing heterocycles are linked through a squarilium group and a croconic methine group, or cyanine dyes; condensed polycyclic aromatic compounds such as anthracene and pyrene; chain compounds formed by polymerization of an aromatic compound and a heterocyclic compound; polymers of diacetylene groups; derivatives and analogues of tetraquinodimethane or tetrathiafluvalene and their charge-transfer complexes; and metal complex compounds such as ferrocene and trisbipyridine ruthenium complex.

In addition to the above-mentioned low molecular substances, various high polymeric substances may also be useful, such as condensation polymers like polyimides, polyphenylene, and polythiophene, and biopolymers like polypeptides and bacteriorhodopsin.

The organic recording medium may be formed by vapor deposition, cluster ion beam method, or like methods. However, from among the known prior techniques, LB methods are highly preferable in view of controllability, ease of, and reproducibility of the formation of the medium.

The present invention is described below in detail by reference to Examples.

EXAMPLE 1

FIG. 1 is a cross-sectional view of the cantilever of this Example. The cantilever has piezoelectric films 101, 102, upper driving electrodes 103, 103', an intermediate driving electrode 105, lower driving electrodes 106, 106', a tip 108, and a probe leader electrode 109. The piezoelectric thin films 101, 102 were made of ZnO of 0.3 $\mu m$ thick with c-axis orientation, which were formed by magnetron sputtering by use of a ZnO target in an oxygen-argon mixture atmosphere. The driving electrodes 103, 103', 105, 106, 106', and the probe leader electrode 109 were made of gold of 0.1 $\mu m$ thick which were formed by vacuum vapor deposition. The cantilever had a length of 1000 $\mu m$ and a width of 200 $\mu m$.

The shape of the driving electrodes 103, 103', 105, 106, 106' which is characteristic of the present invention is described below. In FIG. 1, the upper driving electrodes 103, 103', the lower driving electrodes 106, 106' had a width of 70 μm respectively, and the space portions between the driving electrodes 103, 106 and the other driving electrodes 103', 106' were 40 μm in width, the total width being 180 μm. On the other hand, the intermediate electrode 105 was made to have a width of 190 μm. Positional deviation of 2 μm was brought about in formation of the intermediate driving electrode 105. However, decrease of the effective electrode area ascribable to the deviation did not arise because of the larger width of the intermediate electrode. The similar positional deviation was brought about in formation of the upper driving electrodes 101, 103'. The decrease of the effective electrode area ascribable to the deviation did not arise also in this case. This cantilever could be derived three-dimensionally by controlling the electric fields for the driving electrodes 103, 103', 105, 106, 106'.

The intermediate electrode 105 was kept at the ground potential, and a voltage of +1 V was applied to the upper driving electrodes 103, 103' and the lower driving electrodes 106, 106' respectively. Consequently, the tip portion of the cantilever displaced by 2.2 μm in the Z direction without twisting of the cantilever.

Instead of ZnO of this Example, the piezoelectric film may be made of other piezoelectric substance such as AlN, TiBaO, PbZrTiO, and PbTiO. The dimension of the cantilever is not limited to the above value.

EXAMPLE 2

An STM apparatus was provided by employing the cantilever type probe of Example 1. The apparatus was similar to the one shown by the block diagram in FIG. 3. With this apparatus, a cleavage face of an HOPG substrate (highly oriented pyrolysis graphite) as a sample was observed at a bias current of 1 nA and scanning area of 100Å×100Å, whereby an excellent atomic image was obtained.

Further, a small stepped portion of the HOPG substrate was similarly observed with a scanning area of 500Å×500Å. The probe was once taken away from the substrate, and then the observation was made again. The stepped portion was observed at the same position as above.

EXAMPLE 3

An information apparatus is described which employs a plurality of cantilever type probes of the present invention.

Figure 2:
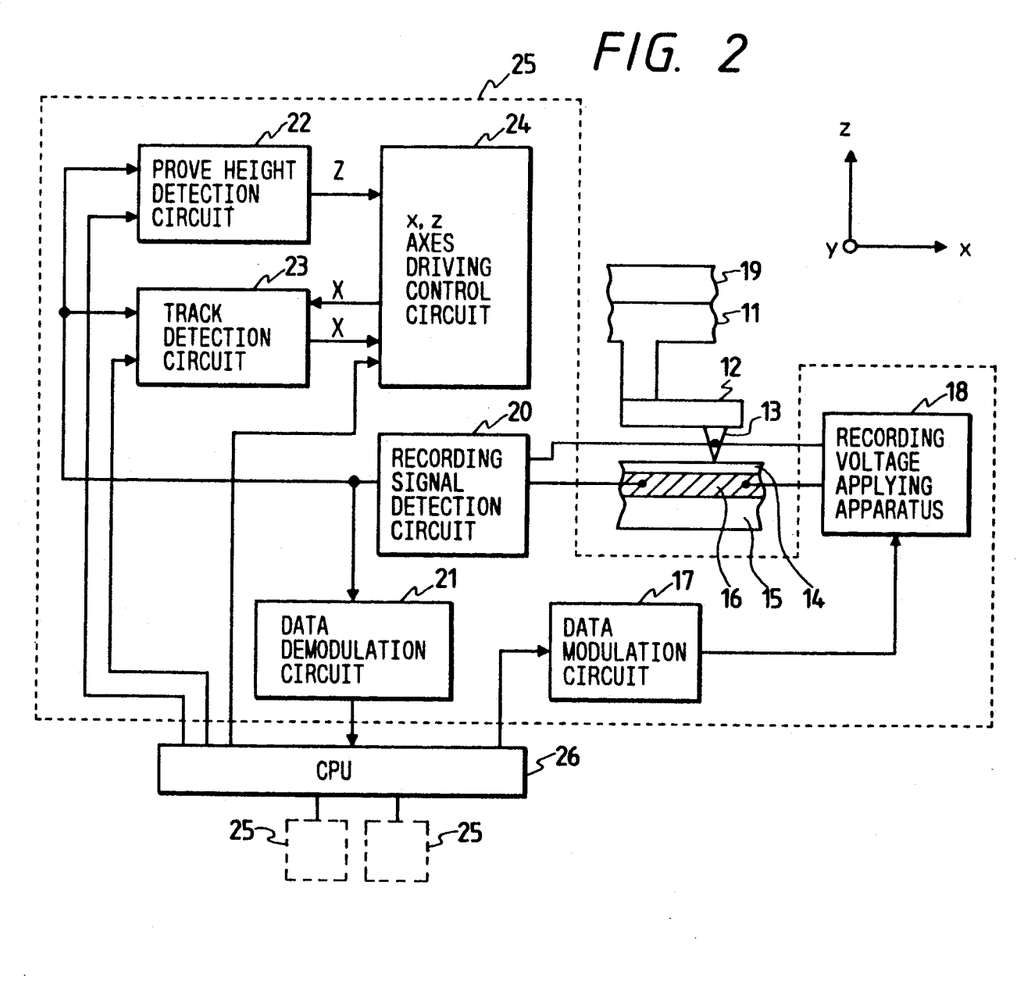
FIG. 2 is a block diagram of an information processing apparatus of the present invention.

FIG. 2 shows the construction of the main portion and the block diagram of the apparatus. The recording-reproducing head 11 is provided with the cantilever type probes 12 of the present invention. In FIG. 2, only one probe is shown. The plurality of tips 13 are arranged so as to confront evenly the recording medium.

In FIG. 2, a voltage is applied between the recording medium 14 for recording information and the probes by use of a base electrode 15. The recording medium 14 is held by a recording medium holder 16. The recording medium is prepared in such a manner that, on a substrate, e.g; a quartz substrate, Cr is deposited in a thickness of 50Å by vacuum vapor deposition, and thereon Au is deposited in a thickness of 300Å by the same method, and further thereon SOAZ (squarilium-bis-6-octylazulene) is laminated in four layers by an LB method. The resulting medium exhibits electric memory effect. The data to be recorded is modulated by a data modulation circuit 17 into a signal suitable for recording. The signal modulated by the data modulation circuit is recorded on the recording medium 14 by applying a voltage between the base electrode 15 and the tip 13 by means of a recording voltage applying apparatus 18. The tip 13 is brought close to the recording medium 14 at a predetermined distance. A voltage is applied, which exceeds the threshold value for causing conductivity change in the recording medium, for example, a rectangular pulse voltage of 3 V and a width of 50 ns, to the recording medium by means of the recording voltage applying apparatus 18. Thereby, the recording medium is changed locally in its characteristics to form a low electric resistance portion. This process is conducted by scanning the recording medium 14 with the tips by means of an X-Y stage 19 to record the information. The scanning by means of the X-Y stage 19 is controlled by a control mechanism, which is not shown in the drawing, such as a cylindrical piezoactuator, a parallel spring, a differential micrometery a voice coil, an inch worm, and the like.

The recording voltage applying apparatus 18 is used also for erasing recorded bits. The tip 13 is brought close at a predetermined distance to the recorded bit on the recording medium 14. A voltage is applied, which exceeds the threshold value, for example, a triangular pulse voltage of 7 V and a width of 50 ns width, to change locally the characteristics of the recorded bits to equalize the electric resistance of the recorded bits with that of no-bit portions.

A recording signal detection circuit 20 detects a tunnel current flowing, on application of a bias voltage, between the tip 13 and the recording medium 14. A data modulation circuit 21 modulates tunnel current signals detected by the recording signal detection circuit 20. In reproduction, the tip 13 is kept at a predetermined distance from the recording medium 14, and a voltage is applied, which does not exceed the threshold voltage for causing a change in electric conductivity in the recording medium. For example, a DC voltage of 200 mV. between the tip 13 and the recording medium 14. In this state, the tunnel current signal, which is detected by use of the recording signal detection circuit 20 during scanning of the recording data line on the recording medium 14, corresponds to the recorded data signal. Therefore the detected tunnel current signal is outputted after current-voltage conversion, and demodulated by data demodulation circuit to obtain reproduced data signal.

A probe height detection circuit 22 receives the detected signals from the recording signal detection circuit 20, cuts therefrom high frequency oscillation caused by the presence of information bits and treats the resulting signals and send instruction signals to an x-z axes driving control circuit 24 to move the tips vertically to keep the high-frequency-free signal constant. Thereby, the gap between the tips 13 and the medium 14 is kept approximately constant.

A track detection circuit 23 detects the track on which the data given by the tip 13 are recorded or a deviation of the probe from the recorded data line (hereinafter referred to as "track") during the scanning of the recording medium 14 with the tip 13.

As described above, it is necessary that the cantilever be displaced by means of the driving control circuit 24 such that the probe travels with vibration for tracking by adjusting the gap between the tip 13 and the medium 14.

The recording-reproducing circuit 25 is constituted from the data modulation circuit 17, the recording voltage applying apparatus 18, the recording signal detection circuit 20, the data modulation circuit 21, the probe height detection circuit 22, the track detection circuit 23, the z axis driving control circuit 24, and the x-y axes driving control circuit 24. The recording-reproducing apparatus comprises the above recording-reproducing circuits 25 and a CPU 26 for controlling the circuit.

It was confirmed that the information processing apparatus of the present invention is capable of writing, reading, and erasing information stably by use of the same probes with sufficient reproducibility.

As described above, in a cantilever type probe, the twisting of the cantilever in operation is prevented by making larger the width of the intermediate driving electrode than the widths of other driving electrode to avoid the decrease of the effective electrode areas caused by positional deviation in formation of driving electrodes. An STM or an information processing apparatus employing the above cantilever is made stable and reliable since positional deviation does not occur relative to the access coordinates.

What is claimed is:

1. A cantilever type probe comprising:
   a cantilever-shaped displacement element and a tip;
   said displacement element including a first electrode layer, a first piezoelectric material film and a second piezoelectric material film which films are laminated on opposite sides of the first electrode layer, and a second electrode layer and a third electrode layer which second and third electrode layers are laminated on outer surfaces of the piezoelectric material films laminated on the opposite sides of the first electrode layer, and
   said tip being connected with a leader electrode located at a free end of the displacement element,
   wherein the first electrode layer protrudes outward in a width direction of the displacement element more than the second and third electrode layers.

2. The cantilever type probe according to claim 1, wherein said first electrode layer is larger in the width direction of the displacement element than said second electrode layer and is larger in the width direction of the displacement element than said third electrode layer.

3. The cantilever type probe according to claim 1, wherein a difference in the width in the width direction of said displacement element between said first electrode layer and either said second electrode layer or said third electrode layer is not less than twice the maximum positional deviation in electrode alignment.

4. The cantilever type probe according to claim 1, wherein each of said second and third electrode layers comprises a pair of separated electrodes in the width direction of said displacement element.

5. The cantilever type probe according to claim 1, wherein a driving electric source for displacing said displacement element by a converse piezoelectric effect is connected with said first, second and third electrode layers.

6. The cantilever type probe according to claim 1, wherein a virtual area of said first electrode layer is larger than those of said second and third electrode layers, respectively.

7. The cantilever type probe according to claim 1, wherein said first, second and third electrode layers are placed parallel to each other.

8. A scanning tunneling microscope, comprising a cantilever type probe according to any one of claims 1 to 7, a driving means for displacing said probe, a stage for a specimen so as to approach and locate the specimen close to said tip, and a potential applying means for applying a bias voltage between the tip and the specimen.

9. An information processing apparatus, comprising a cantilever type probe according to any one of claims 1 to 7, a driving means for displacing said probe, a stage for a recording medium so as to approach and locate the recording medium close to said tip of said probe, and a potential applying means for applying a pulse voltage between the tip and the medium; wherein an information is written on the recording medium by electric current flowing between the tip and the recording medium.

10. An information processing apparatus, comprising a cantilever type probe according to any one of claims 1 to 7, a driving means for displacing said probe, a stage for a recording medium so as to approach and locate the recording medium close to said tip, and a potential applying means for applying a bias voltage between the tip and the recording medium.
    wherein an information in the recording medium is read out by electric current flowing between the tip and the recording medium.

11. An information processing apparatus, comprising a cantilever type probe according to any one of claims 1 to 7, a driving means for displacing said probe, a stage for a recording medium so as to approach and locate the recording medium close to said tip of said probe, a first potential applying means for applying a pulse voltage between the tip and the recording medium, and a second potential applying means for applying a bias voltage between the tip and the recording medium and an information in the recording medium is read out by electric current flowing between the tip and the recording medium.

* * * * *

UNITED STATES PATENT AND TRADEMARK OFFICE
CERTIFICATE OF CORRECTION

PATENT NO. : 5,317,152

DATED : May 31, 1994

INVENTOR(S) : OSAMU TAKAMATSU, ET AL.

It is certified that error appears in the above-identified patent and that said Letters Patent is hereby corrected as shown below:

ON THE TITLE PAGE

At [56] OTHER PUBLICATIONS, "Second." should read --Second--.
   At [57] ABSTRACT, line 7, "which layer" should read --which layers--.
   At [57] ABSTRACT, line 17, "to" should read" --close to--.

COLUMN 1

Line 19, "Observation" should read --observation--.
   Line 37, "thin" should be deleted and "an" should be deleted.
   Line 38, "troconducitve" should read --troconductive--.
   Line 43, "are" should read --is--.

COLUMN 2

Line 15, "module" should be deleted.
   Line 58, "result" should read --results--.
   Line 64, "the" should be deleted.

COLUMN 3

Line 19, "with" should read --with a--.
   Line 32, "protrude" should read --protrudes--.
   Line 55, "driving means" should read --driver--.

UNITED STATES PATENT AND TRADEMARK OFFICE
CERTIFICATE OF CORRECTION

PATENT NO. : 5,317,152
DATED : May 31, 1994
INVENTOR(S) : OSAMU TAKAMATSU, ET AL.

It is certified that error appears in the above-identified patent and that said Letters Patent is hereby corrected as shown below:

COLUMN 4

Line 9, "the" should read --to the--.
Line 23, "end" should read --and--.
Line 56, "the" should be deleted and "formation." should read --formation,--.
Line 57, "The" should read --the--.
Line 60, "positional deviation caused by the maximum" should be deleted.

COLUMN 5

Line 65, "1 m" should read --1 µm--.

COLUMN 6

Line 11, "like:" should read --like.--.
Line 17, "are" should read --is--.
Line 19, "less," should read --less and--.
Line 28, "nylporphyrin:" should read --nylporphyrin;--.

COLUMN 8

Line 21, "micrometery" should read --micrometer,--.
Line 41, "medium. For" should read --medium, for--.
Line 56, "send" should read --sends--.

UNITED STATES PATENT AND TRADEMARK OFFICE
CERTIFICATE OF CORRECTION

PATENT NO. : 5,317,152
DATED : May 31, 1994
INVENTOR(S) : OSAMU TAKAMATSU, ET AL.

Page 3 of 3

It is certified that error appears in the above-identified patent and that said Letters Patent is hereby corrected as shown below:

<u>COLUMN 9</u>

Line 8, "the z axis driving control circuit 24, and the x-y axes" should read --and the x-y-z axes--.

<u>COLUMN 10</u>

Line 30, "medium;" should read --recording medium;--.
   Line 40, "medium." should read --medium;--.
   Line 52, "medium" should read --medium; wherein an information is written on the recording medium--.

Signed and Sealed this

Twenty-first Day of February, 1995

Attest:

BRUCE LEHMAN

Attesting Officer     Commissioner of Patents and Trademarks